May 7, 1968  R. H. ADAMS  3,382,309
METHOD AND APPARATUS FOR FORMING AN END PROFILE
ON ASBESTOS-CEMENT PIPE
Filed Oct. 1, 1964  3 Sheets-Sheet 3

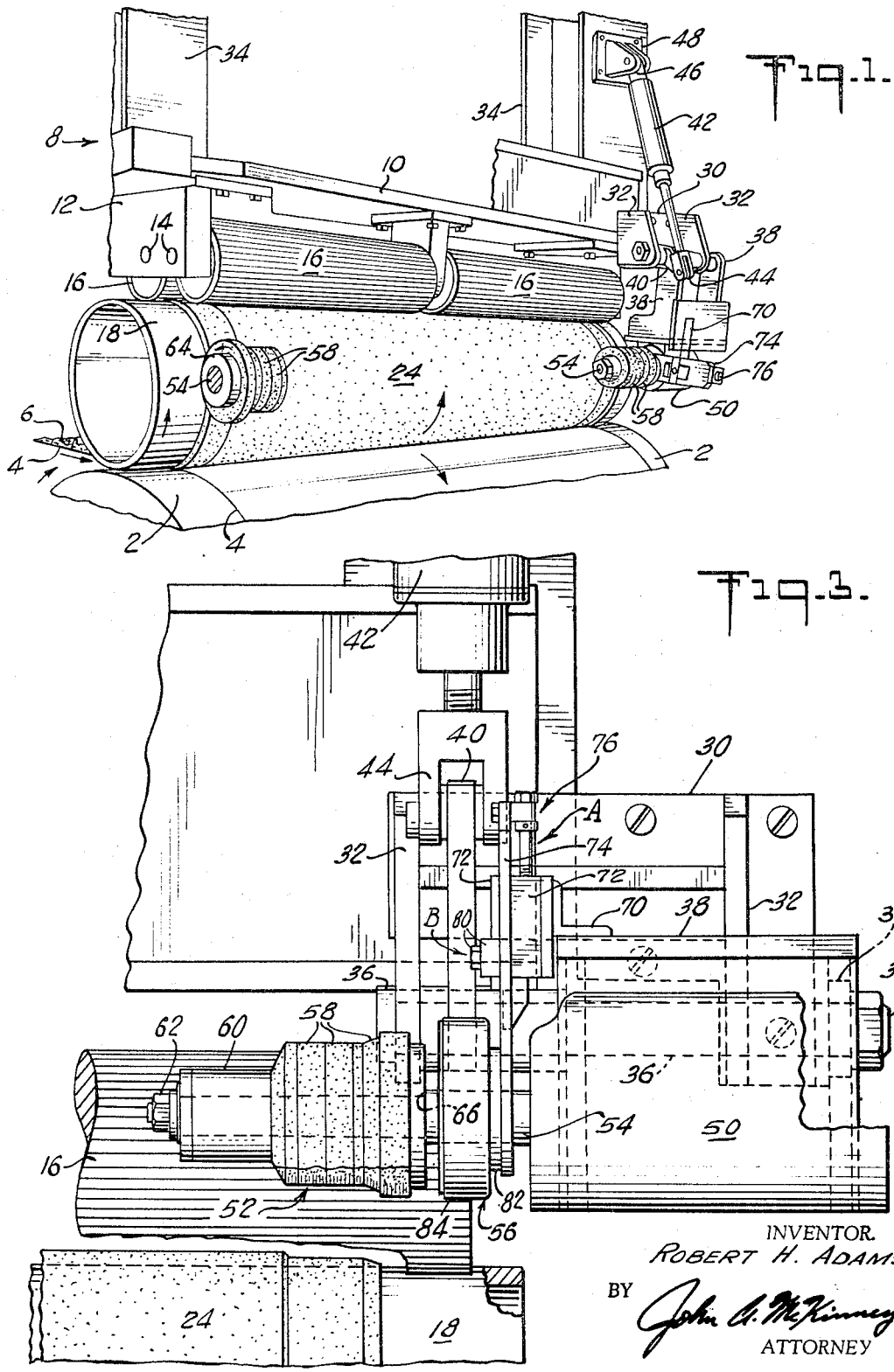
May 7, 1968 R. H. ADAMS 3,382,309
METHOD AND APPARATUS FOR FORMING AN END PROFILE
ON ASBESTOS-CEMENT PIPE
Filed Oct. 1, 1964 3 Sheets-Sheet 1
INVENTOR.
ROBERT H. ADAMS
BY John A. McKinney
ATTORNEY

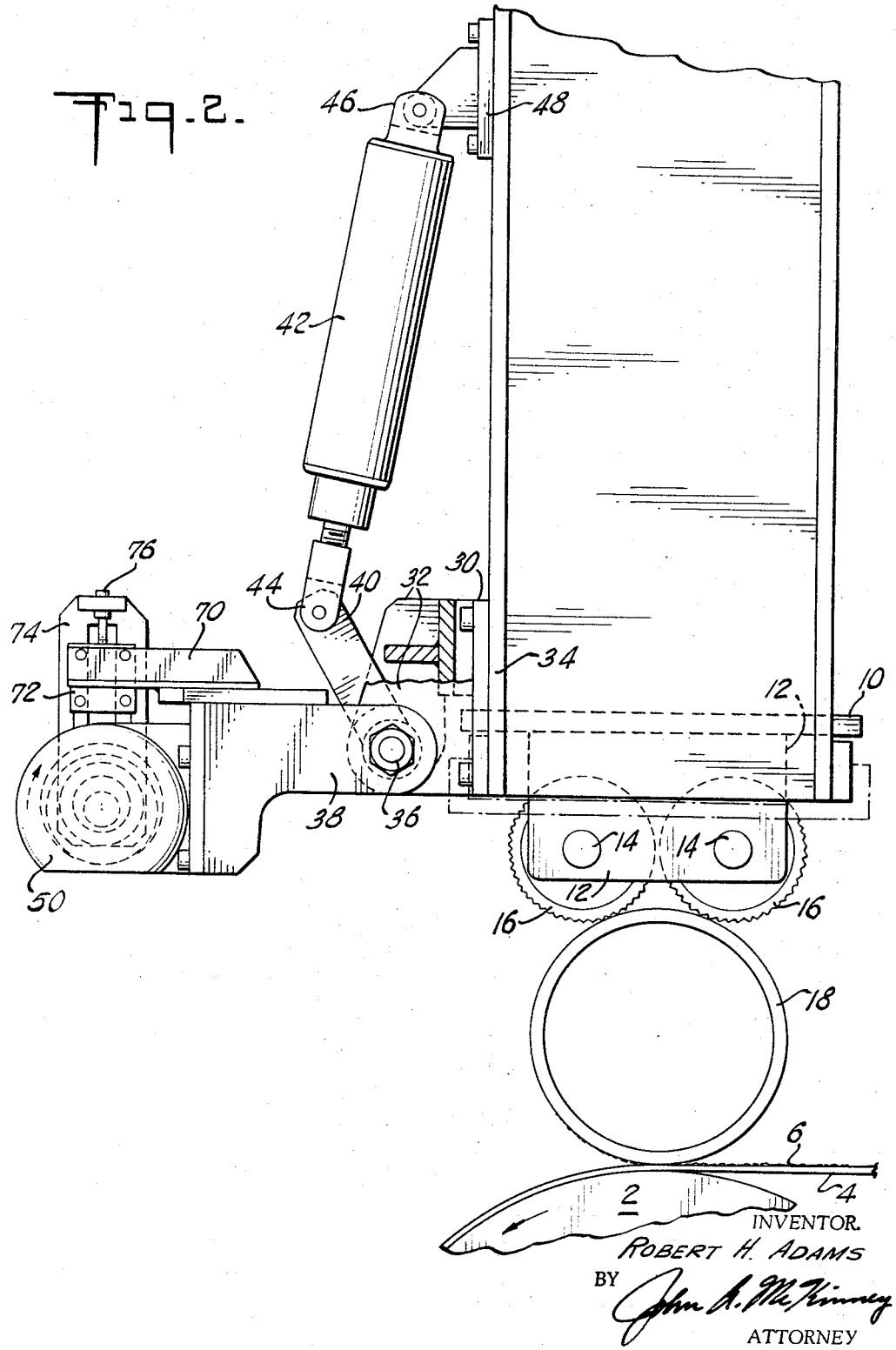

INVENTOR.
ROBERT H. ADAMS
BY
John A. McKinney
ATTORNEY

United States Patent Office 3,382,309
Patented May 7, 1968

3,382,309
METHOD AND APPARATUS FOR FORMING AN END PROFILE ON ASBESTOS-CEMENT PIPE
Robert H. Adams, Somerville, N.J., assignor to Johns-Manville Corporation, New York, N.Y., a corporation of New York
Filed Oct. 1, 1964, Ser. No. 400,858
12 Claims. (Cl. 264—296)

ABSTRACT OF THE DISCLOSURE

A system for the formation of an end profile on asbestos-cement pipe by removing portions of the asbestos-cement material while it is still wet and on the forming mandrel.

---

This invention relates to method and apparatus for the manufacture of articles which are formed on a mandrel from a wet stock and more particularly is directed to the manufacture of asbestos-cement pipe from a wet asbestos-cement material. More specifically, the invention is directed to method and apparatus for the manufacture of asbestos-cement pipe which includes the removing of a portion of the wet asbestos-cement material from the pipe during the forming operation or while the asbestos-cement material is still uncured so as to provide the asbestos-cement pipe with a desired profile. While the invention is described with reference to the formation of asbestos-cement pipe, it is understood that the invention is applicable in principle to other articles similarly formed on a mandrel.

The conventional method of manufacturing asbestos-cement pipe involves winding a wet sheet of asbestos-cement material on a rotating, hollow mandrel while applying high pressure thereto. When a pipe of suitable wall thickness has been formed, the mandrel is removed from the pressure applying means and the pipe is then removed from the mandrel for curing. After the pipe has been cured, the peripheral surface of the pipe adjacent its ends is machined so as to form the peripheral surface of the pipe with a desired type of end profile. This additional machining operation is necessary so that the pipe end may be properly received in the couplings and fittings required by all pipe lines. It is well recognized that this additional machining operation is undesirable and many attempts have been made to eliminate it. Some manufacturers have gone so far as to make plain pipe ends and provide complicated couplings. However, this is no real solution to the problem. The instant application eliminates this adidtional machining operation while still providing pipe with desired end profiles.

It is an object of the instant invention to provide method and apparatus for forming an end profile on asbestos-cement pipe during the formation of the pipe on a mandrel.

It is another object of the instant invention to provide method and apparatus for forming an end profile on asbestos-cement pipe while the asbestos-cement material is in the uncured state.

The foregoing objects are accomplished in accordance with the instant invention by a system which in the preferred embodiment of the invention is used in conjunction with a system of manufacturing asebestos-cement pipe wherein the asbestos-cement pipe is formed by winding a sheet of wet asbestos-cement material around a mandrel to form a plurality of laminations thereon. In this preferred embodiment of the invention, a rotating wire brush assembly is moved into contact with the peripheral surface of the asbestos-cement pipe while it is still on the mandrel. Sufficient force and movement is applied to the wire brush assembly so as to remove portions of the wet asbestos-cement material from the peripheral surface of the pipe so as to form a desired profile on the pipe adjacent its ends. In the preferred embodiment of the invention, the wire brush assembly comprises a plurality of generally circular wire brushes mounted in adjacent position on a common shaft. Some of the wire brushes have peripheral surfaces of constant outside diameters while others of the wire brushes have peripheral surfaces of varying outside diameters. The peripheral surface of the wire brush assembly is complementary to that of the desired profile on the pipe. While in the preferred embodiment of the invention, the rotating wire brush assembly is moved into contact with the peripheral surface of the asbestos-cement pipe while the plurality of laminations are still being formed on the mandrel, it is understood that advantageous results may be obtained by utilizing the wire brush assembly after the pipe has been formed but while it is still in the uncured state. Thus, the present invention eliminates the extra handling step formerly associated with providing the pipe with the necessary end profile.

The invention will be more fully understood and further objects and advantages thereof will become apparent when reference is made to the following detailed description of a preferred embodiment of the invention and the accompanying drawings in which:

FIG. 1 is a pictorial representation of a portion of the forming section of an asbestos-cement pipe machine;

FIG. 2 is a side elevation illustrating the apparatus of the instant invention;

FIG. 3 is a front view of a portion of FIG. 2;

Figure 4:
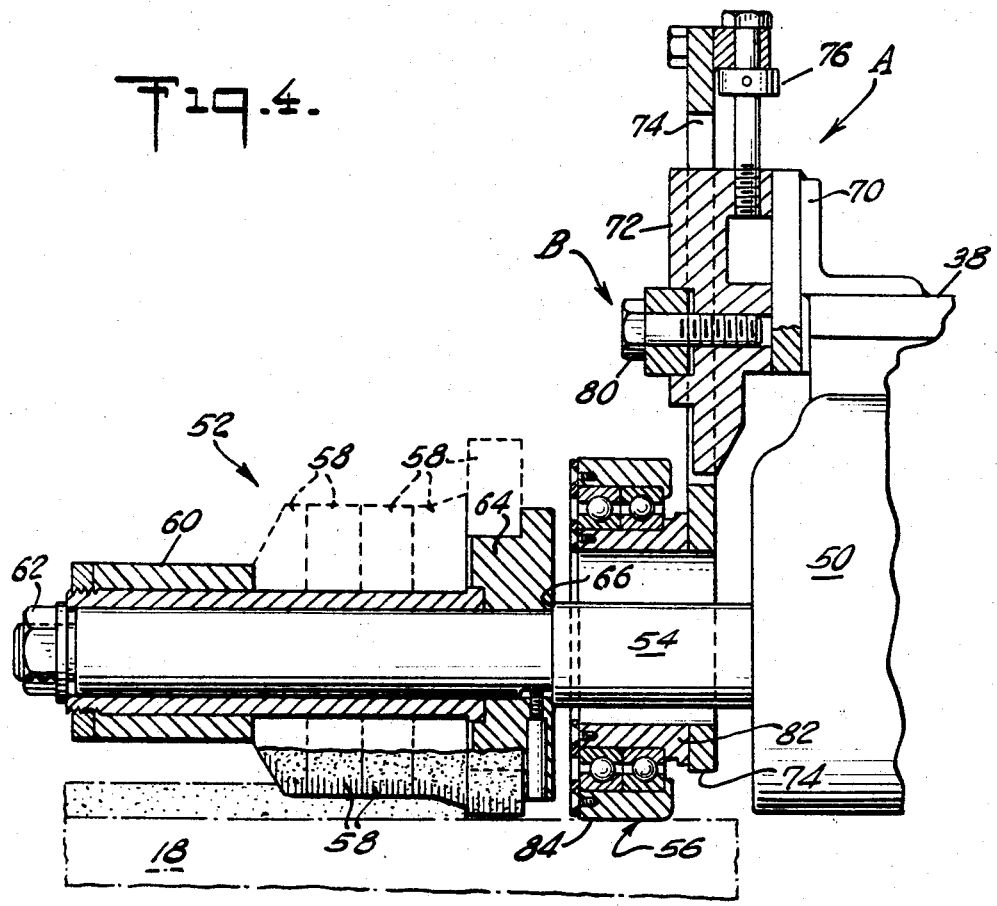
FIG. 4 is a view partially in cross-section showing the wire brush assembly in contact with an asbestos-cement pipe.
Figure 5:
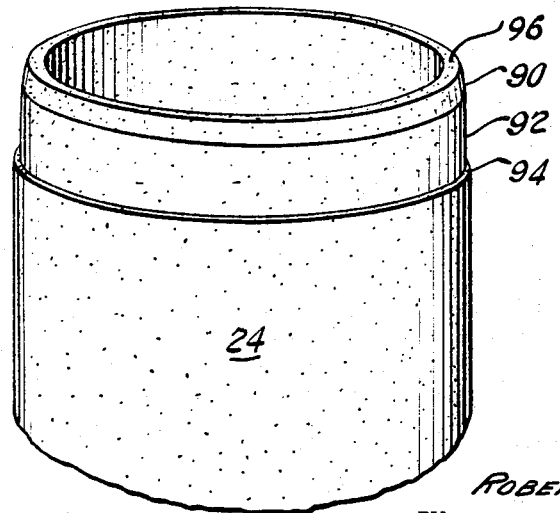
FIG. 5 is the pictorial representation of an end portion of a pipe.

Referring to the drawing, there is illustrated in FIG. 1 conventional apparatus for forming a pipe on a mandrel which in the preferred embodiment of the invention comprises an anvil roll 2 over which there travels a felt 4 carrying a wet stock 6 comprising asbestos, cement and other materials which stock is deposited thereon by conventional apparatus (not shown) such as a cylinder mold or molds of the type illustrated in Rembert, U.S. Patent No. 2,322,592. The anvil roll, 2 a rigid element capable of withstanding pipe forming pressures without flexing, is mounted for rotation in fixed supports (not shown), and is rotated by conventional means (not shown) to drive the felt 4 in the direction indicated by the arrow. Positioned above the anvil roll 2 is a press section 8 which is moved toward and away from the anvil roll 2 by mechanical means (not shown). In the preferred embodiment of the invention, the press section 8 comprises a heavy bar 10 secured to the hydraulic means (not shown) and having depending end portions 12 arranged to provide journals for the shafts 14 of two rows of press rolls 16. In the preferred embodiment, the rolls 16 are covered with a rubber-like material. If desired the rolls 16 may be of the type illustrated in FIG. 2 of U.S. Patent No. 3,000,776 and mounted in a similar manner.

In the conventional manner of forming pipe with the above described apparatus, the press section 8 is moved away from the anvil roll 2 and a hollow steel mandrel 18 is placed on the anvil roll 2. The mandrel 18 is supported only by resting on the anvil roll 2. The press section 8 is moved toward the anvil roll 2 so that the mandrel 18 is between the anvil roll 2 and the press rolls 16. The anvil roll 2 is then rotated in a direction indicated by the arrows, causing movement of the felt 4 over the anvil roll 2. The wet stock 6 on the felt 4 will adhere to the mandrel 18 and will be wound around the mandrel 18 to form a plurality of laminations thereon as the mandrel is caused to rotate by the movement of the felt 4. The wet stock 6 is then condensed thereon by the press rolls 16 and is bonded to the mandrel to form a pipe 24.

The preferred embodiment of the instant invention will be explained chiefly in relation to the illustrations in FIGS. 2–4, inclusive. A base 30 having a pair of spaced outwardly directed mounting arms 32 is secured to the frame 34 of the press section 8. Each of the arms 32 has an opening therein to receive the shaft 36 which is rotatably journaled in the arms 32. A support 38 having a lever arm 40 extending at an acute angle therefrom is secured to the shaft 36 for rotation therewith. Hydraulic means 42 is pivotally attached at one end 44 to the lever arm 40 and at the other end 46 is pivotally attached to a base 48 secured to the beam 34 attached to the press section 8. At the other end of the support 38 there is secured thereto the motor 50 and the wire brush assembly 52. The shaft 54 of the motor 50 extends through a control means 56 and the wire brushes 58 of the wire brush assembly 52 are secured in proper position on the end of the shaft 54 by an appropriate spacer block 60 and nut 62. Another spacer 64 abuts against a shoulder 66 on the shaft 54 so that the wire brushes 58 are secured in proper position on the shaft between the spacers 60 and 64. It is to be understood that the axial length of the spacers 60 and 64 are varied in accordance with the desired profile for the pipe end and the type and number of wire brushes being used.

The control means 56 limits the movement of the brush assembly 52 toward the mandrel 18 and comprises an arm 70 secured at one end to the support 38 and having in its other end a block 72 for supporting a movable lever 74. The movement of the lever 74 is controlled by a screw means 76 operatively connected to one end of the lever 74 and a portion of the block 72. The lever 74 is guided for linear movement by slots in the block 72. A set screw assembly 80 holds the lever 74 in adjusted position. The other end of the lever 74 supports a bearing 82 wherein the outer ring 84 thereof is designed to contact the peripheral surface of the mandrel 18 so as to limit the movement of the brush assembly 52 toward the mandrel. The bearing 82 allows the outer ring 84 to rotate when it contacts the peripheral surface of the mandrel 18. This control means 56 allows the brush assembly 52 to be utilized effectively with mandrels 18 of any diameter.

In operation of the apparatus illustrated in the instant application, a mandrel 18 is positioned on the anvil roll 2 and the press section 8 is lowered until the press rolls 16 come into contact with the mandrel. The anvil roll 2 is rotated in the direction indicated by the arrow and this causes movement of the felt 4 carrying the layer of asbestos-cement material 6. Also, movement of the anvil roll 2 and the felt 4 functions to rotate the mandrel 18. As the felt 4 passes between the anvil roll 2 and the mandrel 18, the wet asbestos-cement material 6 carried by the felt 4 is transferred to the mandrel 18 and as the mandrel 18 rotates, a plurality of laminations of the asbestos-cement material are built up thereon until a pipe 24 having a desired wall thickness is obtained. During the formation of the pipe on the mandrel, the press rolls 16 apply pressure to the laminations of the wet asbestos-cement material so as to compress this material to the desired density.

In the preferred embodiment of the invention, the wire brush assembly 52 is operated from a time shortly after the beginning of the formation of the laminations on the mandrel until the final wall thickness of the pipe has been formed. At a given interval after the beginning of the formation of the laminations of the asbestos-cement material on the mandrel, the motor 50 is started and the wire brushes 58 are rotated thereby. In the preferred embodiment of the invention, the brush assembly 52 is rotated in the direction indicated by the arrows so that the surface of the brushes adjacent the mandrel is moving in a direction opposite to the direction of movement of the adjacent surface of the mandrel. The hydraulic means 42 is then actuated to move the lever arm 40 and therefore the support 38 so as to move the wire brush assembly 52 in an arcuate path until the wire brushes 58 contact the peripheral surface of the pipe 24 adjacent the end thereof. It is to be understood that there is a wire brush assembly of this nature adjacent each end of the pipe forming section and that these assemblies work independently but in unison. The wire brush assemblies 52 function to remove portions of the wet asbestos-cement material from the end portion of the pipe being formed on the mandrel 18 so as to provide the pipe ends with the desired type of profile. Pressure is applied to the wire brushes acting on the peripheral surface of the pipe by the hydraulic means 42 acting through the lever arms 38 and 40. Movement of the wire brush assemblies toward the mandrel is regulated by the outer ring 84 of the bearing 82 as it contacts the peripheral surface of the mandrel 18.

Each of the wire brushes 58 forming the wire brush assembly 52 has a peripheral surface having a contour which is complementary to the profile desired on the pipe end. Thus, some of the wire brushes 58 will be of constant outside diameter while others will have a varying outside diameter. In the embodiment of the invention illustrated in the drawings, the wire brush assembly 52 functions to produce a profile adjacent to the end of the pipe 24 having a tapered portion 90, a cylinder portion 92 and a shoulder 94. Also, one of the wire brushes 58 cooperates to form the end 96 of the pipe.

In the preferred embodiment of the invention, the wire brushes 58 are of the type comprising metallic wires bonded with an elastomer such as those manufactured by Osborne Manufacturing Company and marketed under the trade designation Ty Master. While these brushes have been described in the illustrations of the preferred embodiment of the instant invention, it is understood that other means may be employed to remove the wet asbestos-cement material from the end of the pipe while it is being laminated on the mandrel. However, it is to be understood that because of the physical characteristics of the materials being worked on and the operating conditions normally found at this particular location in a conventional asbestos-cement pipe machine not all means may be employed. Significantly good results have been obtained with the wire brush assemblies of the type described above, and therefore, these wire brush assemblies constitute a preferred embodiment of the invention. It is also understood that the inventive concepts of this application may be utilized effectively with all sizes, diameters, wall thicknesses, compositions, and other variables normally associated with asbestos-cement pipe.

In some instances it may be desirable to form the asbestos-cement pipe on the mandrel and to remove the mandrel with the uncured asbestos-cement pipe thereon from the pipe forming machine prior to the forming of the desired end profile on the pipe. In those instances the mandrel with the uncured asbestos-cement pipe thereon is supported for rotation in any conventional means (not shown), and brush assemblies 52 are suitably located on such means. The mandrel 18 and the brushes 58 are rotated, as described above, and the brushes 58 contact the appropriate sections of the peripheral surface of the pipe on the mandrel to remove portions of the uncured asbestos-cement material thereon so as to form the desired end profiles on the pipe. As described above, the control means 56 functions to limit the movement of the brush assembly 52 toward the mandrel 18.

While the invention has been described in rather full detail, it will be understood that these details need not be strictly adhered to and that various changes and modifications may suggest themselves to one skilled in the art, all falling within the scope of the invention as defined by the subjoined claims.

What I claim is:
1. Method for forming an end profile on asbestos-cement pipe comprising:

(a) rotating a mandrel about its longitudinal axis, (b) winding a sheet of wet asbestos-cement material around said mandrel during the rotation thereof to form a pipe on said mandrel, (c) removing portions of the wet asbestos-cement material from the pipe during the formation thereof on said mandrel so as to form said end profile on said pipe.

2. Method for forming an end profile on asbestos-cement pipe comprising:

(a) rotating a generally cylindrical forming means about its longitudinal axis, (b) applying wet asbestos-cement material on said forming means during the rotation thereof, to form a pipe thereon, and (c) removing portions of the asbestos-cement material while wet from the pipe on said forming means so as to form said end profile on said pipe.

3. Apparatus for forming an end profile on asbestos-cement pipe comprising:

(a) means for supporting a mandrel having a pipe comprising uncured asbestos-cement material thereon for rotation about its axis, (b) means for rotating said mandrel with said pipe, (c) at least one brush assembly, (d) means for supporting said brush assembly for rotation about its axis, (e) means for rotating said brush assembly, and (f) means for moving said brush assembly into contact with the peripheral surface of said pipe and removing portions of the uncured asbestos-cement material from said pipe so as to form said end profile on said pipe.

4. Apparatus for forming an end profile on asbestos-cement pipe comprising:

(a) means for supporting a mandrel having a pipe comprising uncured asbestos-cement material thereon for rotation about its axis, (b) means for rotating said mandrel with said pipe, (c) at least one brush assembly comprising a plurality of generally circular wire brushes, (d) means for supporting said wire brushes in adjacent position with their axes in alignment, (e) means for rotating said wire brushes, and (f) means for moving said wire brushes into contact with the peripheral surface of said pipe and removing portions of the uncured asbestos-cement material from said pipe so as to form said end profile on said pipe.

5. Apparatus for forming an end profile on asbestos-cement pipe comprising:

(a) means for supporting a mandrel having a pipe comprising uncured asbestos-cement material thereon for rotation about its axis, (b) means for rotating said mandrel with said pipe, (c) a pair of brush assemblies, (d) each of said brush assemblies comprising a plurality of generally circular wire brushes supported in adjacent position with their axes in alignment, (e) means for rotating each of said wire brush assemblies, and (f) means for moving each of said wire brush assemblies into contact with the peripheral surfaces of said pipe adjacent an associated end thereof and removing portions of the uncured asbestos-cement material from said pipe so as to form said end profile on said pipe.

6. Apparatus for forming an end profile on asbestos-cement pipe comprising:

(a) means for supporting a mandrel for rotation about its axis, (b) means for winding a sheet of wet asbestos-cement material around said mandrel to form a pipe thereon, (c) at least one brush assembly, (d) means for supporting said brush assembly for rotation about its axis, (e) means for rotating said brush assembly, and (f) means for moving said brush assembly into contact with the peripheral surface of said pipe during the winding of said sheet on said mandrel so as to remove portions of the wet asbestos-cement material from said pipe so as to form a desired profile on said pipe.

7. Apparatus for forming an end profile on asbestos-cement pipe comprising:

(a) means for supporting a mandrel for rotation about its axis, (b) means for winding a sheet of wet asbestos-cement material around said mandrel to form a pipe thereon, (c) at least one brush assembly comprising a plurality of generally circular wire brushes, (d) means for supporting said wire brushes in adjacent position with their axes in alignment, (e) means for rotating said wire brushes, and (f) means for moving said wire brushes into contact with the peripheral surface of said pipe during the winding of said sheet on said mandrel and removing portions of the wet asbestos-cement material from said pipe so as to form said end profile on said pipe.

8. Apparatus for forming an end profile on asbestos-cement pipe comprising:

(a) means for supporting a mandrel for rotation about its axis, (b) means for winding a sheet of wet asbestos-cement material around said mandrel to form a pipe thereon, (c) a pair of brush assemblies, (d) each of said brush assemblies comprising a plurality of generally circular wire brushes supported in adjacent position with their axes in alignment, (e) means for rotating each of said wire brush assemblies, and (f) means for moving each of said wire brush assemblies into contact with the peripheral surface of said pipe adjacent an associated end thereof during the winding of said sheet on said mandrel and removing portions of the wet asbestos-cement material from said pipe so as to form said end profile on said pipe.

9. Apparatus for forming an end profile on asbestos-cement pipe comprising:

(a) means for supporting a mandrel for rotation about its axis, (b) means for winding a sheet of wet asbestos-cement material around said mandrel to form a pipe thereon, (c) a pair of brush assemblies, (d) each of said brush assemblies comprising a plurality of generally circular wire brushes supported in adjacent position with their axes in alignment, (e) some of said wire brushes having peripheral surfaces of constant outside diameter and other of said wire brushes having peripheral surfaces of varying outside diameter, (f) means for rotating each of said wire brush assemblies, and (g) means for moving each of said wire brush assemblies into contact with the peripheral surface of said pipe adjacent an associated end thereof during the winding of said sheet on said mandrel and removing portions of the asbestos-cement material from said pipe so as to form said end profile on said pipe.

10. Apparatus for forming an end profile on asbestos-cement pipe comprising:

(a) a mandrel, (b) an anvil roll adapted for supporting said mandrel, (c) each of said mandrel and said anvil roll being mounted for rotation about its own axis, (d) a conveyor belt trained around said anvil roll and passing between said mandrel and said anvil roll,
(e) said conveyor belt carrying a sheet of wet asbestos-cement material thereon,
(f) means for rotating said anvil roll and said mandrel and for moving said conveyor belt with said sheet of said wet asbestos-cement material between said anvil roll and said mandrel to wind said sheet of said asbestos-cement material on said mandrel,
(g) at least one brush assembly,
(h) means for supporting said brush assembly for rotation about its axis,
(i) means for rotating said brush assembly, and
(j) means for moving said wire brush assembly into contact with the peripheral surface of said pipe during the winding of said sheet on said mandrel and removing a portion of the asbestos-cement material from said pipe so as to form said end profile on said pipe.

11. Apparatus for forming an end profile on asbestos-cement pipe comprising:
(a) mandrel,
(b) an anvil roll adapted for supporting said mandrel,
(c) each of said mandrel and said anvil roll being mounted for rotation about its own axis,
(d) a conveyor belt trained around said anvil roll and passing between said mandrel and said anvil roll,
(e) said conveyor belt carrying a sheet of wet asbestos-cement material thereon,
(f) means for rotating said anvil roll and said mandrel and for moving said conveyor belt with said sheet of said wet asbestos-cement material between said anvil roll and said mandrel to wind said sheet of said asbestos-cement material on said mandrel,
(g) a pair of brush assemblies,
(h) each of said brush asemblies comprising a plurality of generally circular wire brushes supported in adjacent position with their axes in alignment,
(i) means for rotating each of said wire brush assemblies, and
(j) means for moving each of said wire brush assemblies into contact with the peripheral surface of said pipe adjacent an associated end thereof during the winding of said sheet on said mandrel and removing portions of the uncured asbestos-cement material from said pipe so as to form said end profile on said pipe.

12. Apparatus for forming an end profile on asbestos-cement pipe comprising:
(a) a mandrel,
(b) an anvil roll adapted for supporting said mandrel,
(c) each of said mandrel and said anvil roll being mounted for rotation about its own axis,
(d) a conveyor belt trained around said anvil roll and passing between said mandrel and said anvil roll,
(e) said conveyor belt carrying a sheet of wet asbestos-cement material thereon,
(f) means for rotating said anvil roll and said mandrel and for moving said conveyor belt with said sheet of said wet asbestos-cement material between said anvil roll and said mandrel to wind said sheet of said asbestos-cement material on said mandrel,
(g) a pair of brush assemblies,
(h) each of said brush assemblies comprising a plurality of generally circular wire brushes supported in adjacent position with their axes in alignment,
(i) some of said wire brushes having peripheral surfaces of constant outside diameter and other of said wire brushes having peripheral surfaces of varying outside diameter,
(j) means for rotating each of said wire brush assemblies, and
(k) means for moving each of said wire brush assemblies into contact with the peripheral surface of said pipe adjacent an associated end thereof during the winding of said sheet on said mandrel and removing portions of the asbestos-cement material from said pipe so as to form said end profile on said pipe.

References Cited
UNITED STATES PATENTS

| 1,670,855 | 5/1928 | Herzog | 264—310 XR |
| 2,370,193 | 2/1945 | Reid. | |
| 2,177,643 | 10/1939 | Ferla | 25—30 |
| 2,373,672 | 4/1945 | Ferla | 25—30 |
| 2,951,305 | 9/1960 | Seymour | 156—154 |
| 2,528,155 | 10/1950 | Magnani | 156—294 XR |

EARL M. BERGERT, *Primary Examiner.*

PHILIP DIER, *Examiner.*